United States Patent [19]

Liao

[11] Patent Number: 4,948,428

[45] Date of Patent: Aug. 14, 1990

[54] GROUTING COMPOSITION AND METHOD FOR GROUTING CONDUITS IN WELL BORES

[75] Inventor: Andrew Liao, Houston, Tex.

[73] Assignee: Baroid Technology, Inc., Houston, Tex.

[21] Appl. No.: 244,846

[22] Filed: Sep. 14, 1988

[51] Int. Cl.$^5$ .............................................. C04B 26/00
[52] U.S. Cl. .................... 106/628; 106/632; 106/633; 252/8.8
[58] Field of Search .............................. 106/74, 84, 78; 166/281, 285, 293; 405/266, 267; 252/8.8

[56] References Cited

U.S. PATENT DOCUMENTS

| | | | |
|---|---|---|---|
| 4,141,841 | 2/1979 | McDanald | 252/8.8 |
| 4,696,698 | 9/1987 | Harriett | 106/74 |
| 4,696,699 | 8/1987 | Harriett | 106/74 |
| 4,797,158 | 1/1989 | Harriett | 106/74 |

*Primary Examiner*—William R. Dixon, Jr.
*Assistant Examiner*—Chris Gallo
*Attorney, Agent, or Firm*—Browning, Bushman, Anderson & Brookhart

[57] ABSTRACT

A pumpable, rehydratable grout composition comprising a water-swellable clay and an aqueous mixture comprised of a hectorite, an alkaline metal tetraborate, an alkaline metal carbonate and an alkaline metal chloride, the grout composition being useful in the sealing of earthen formations such as grouting or cementing of conduits in well bores.

33 Claims, No Drawings

GROUTING COMPOSITION AND METHOD FOR GROUTING CONDUITS IN WELL BORES

BACKGROUND OF THE INVENTION

1. Field of the Invention

The present invention relates to a grout composition and, more particularly, to a pumpable, rehydratable grout composition for use in grouting conduits such as casing, tubing and the like in boreholes.

2. Description of the Background

Grouting or grout compositions are used in well and geotechnical industries for sealing and grouting well casings, plugging abandoned wells, and water-proofing earthen structures. In particular, in the completion of a well bore drilled into the earth, conduits, such as casing, tubing or the like, are normally lowered into the well and a cement slurry is pumped down the well and up the annulus between the pipe and the wall of the well bore. The cement slurry is then maintained in the annulus and allowed to set and bond to the pipe and to the wall of the well bore to thereby hold the pipe in place and prevent fluids from flowing behind the pipe. Numerous different cements and cement-type materials have been used for this purpose. For example, two commonly used grouting materials for grouting water wells are inorganic sodium silicates and organic polymers mixed with a cement slurry generally composed of Portland cement and water. It is also common in these grouting materials to employ bentonite and pozzolans as extenders.

Because of growing environmental concerns, water well cementing or grouting practices have been forced to change in the past few years. For example, grouting slurries containing organic polymers such as polyacrylamides and sulfonated polymers of some aromatic compounds used in prior art grouting compositions have become unacceptable for use in water well grouting in several states.

While there are non-organic-containing grouting compositions, they present several problems. For example, one common grouting method is to position dry, water-swellable clay pellets within the well bore annulus followed by the addition of water which swells the clay to thereby form an impervious layer in the annulus between the conduit and the well bore. However, this method of grouting has several disadvantages. For one, the clay pellets have to be placed in their intended location prior to complete hydration and often there are voids formed between the pellets. Accordingly, when water is added to swell the pellets, void spaces are left which create channels inside the grout column which will allow fluid flow between the conduit and the well bore.

Another common problem encountered in certain grouting compositions is shrinkage of the set grout. Such shrinkage leads to cracking of the set grout and is generally brought on by loss of moisture from the grout caused by differential formation pressure or formation temperature gradients. Since many of these prior art grouts contain generally water impervious or unswellable material added as fillers, once the grout is cracked, it is difficult, if not virtually impossible, to rehydrate. While this problem can be overcome by increasing the water-swellable clay content, this raises the viscosity of the grout composition to the point where pumping of the grout becomes quite difficult. Moreover, unless an effective dispersing agent is present, excess quantities of water-swellable clays, such as bentonite, result in the formation of "fish-eyes" which interfere with pumping.

Accordingly, a grouting composition which is useful in grouting of water wells and geotechnical wells, which contains no environmentally objectionable polymers, which can be disposed in the well annulus without the formation of voids and channels leading to fluid loss and which is readily pumpable and rehydratable, should cracking occur, is greatly needed.

SUMMARY OF THE INVENTION

It is therefore an object of the present invention to provide an improved grout composition.

Another object of the present invention is to provide a grout composition which is free of organic materials.

Still a further object of the present invention is to provide a grout composition which is readily pumpable and rehydratable.

Yet a further object of the present invention is to provide an aqueous mixture which can be mixed with a water-swellable clay to form a pumpable, rehydratable grout composition.

Another object of the present invention is to provide a dry, inorganic additive which can be admixed with a water-swellable clay and water to form a pumpable, rehydratable grout composition.

Yet a further object of the present invention is to provide a method of grouting a conduit in a well borehole by disposing between the conduit and the well borehole a rehydratable grout composition which is readily pumpable and contains no environmentally objectionable organic materials.

The above and other objects of the present invention will become apparent from the description given herein and the appended claims.

In one embodiment, the present invention comprises a dry, inorganic well additive containing hectorite, an alkali metal tetraborate (borate), an alkali metal carbonate and an alkali metal chloride.

In another embodiment of the present invention, the ingredients of the dry additive described above are admixed with water to form an aqueous mixture or dispersion which, in turn, can be admixed with a swellable clay to form a grout composition.

In yet another embodiment of the present invention, there is provided a pumpable, rehydratable grout composition comprising a water-swellable clay and the aqueous mixture or dispersion described above.

In still a further embodiment of the present invention, there is provided a method of grouting a conduit in a well bore wherein the grout composition described above is disposed in the annulus between the well bore and the conduit, the grout composition being allowed to set thereby permanently cementing or sealing off the annulus between the conduit and the well bore.

DESCRIPTION OF THE PREFERRED EMBODIMENT

The grout composition of the present invention employs a water-swellable clay, primarily a water-swellable colloidal clay. Especially preferred as the water-swellable clay is sodium bentonite which, as is well known to those skilled in the art, consists of 80 to 95% by weight of sodium montmorillonite. The water-swellable clay granules used in the compositions and method of the present invention can range from about 8 to 20 mesh and, ideally, have a free swell test of 28 to 29 ml in contact with water. The water-swellable clay, particularly the sodium bentonite, should not be peptized or treated with any organic polymers prior to incorporation into the compositions of the present invention. Indeed, it is a particular feature of the present invention that no fillers are added as in the case with prior art grouting compositions.

In forming the grout composition of the present invention, the water-swellable clay as described above is combined with an aqueous mixture to form a grouting composition or slurry which can be pumped into the well or other earthen formation to accomplish the sealing or grouting. The aqueous mixture, which actually can be described as a slurry or suspension, comprises fresh water and the inorganic compounds. The aqueous mixture also contains from about 1.5 to about 15.5 grams per liter of the aqueous mixture of hectorite, more preferably from about 5.7 to about 7.0 grams per liter. Although natural hectorite will work satisfactorily, synthetic hectorite obtained by treating natural hectorite to substantially remove aluminum compounds is preferred. In general, the hectorite used in the present invention will have a cation exchange capacity much higher than that of the water-swellable clay, i.e. the sodium bentonite. Unlike prior art grouting compositions which employ hectorite as a water-swellable clay or filler, the hectorite is employed in the present composition as a gelling agent.

The aqueous mixture will also contain an inorganic dispersing agent to disperse the water-swellable clay. The inorganic dispersing agent will be an alkali metal borate such as sodium tetraborate, potassium tetraborate, etc., sodium tetraborate or borax having the formula $Na_2B_4O_7-10H_2O$ being preferred. The amount of the alkali metal borate used in the aqueous mixture will range from about 3.0 to about 11 grams per liter of the aqueous mixture, preferably from about 4 to about 6 grams per liter, especially about 5.3 grams per liter.

The aqueous mixture also contains a bonding agent comprising an alkali metal carbonate such as sodium carbonate, potassium carbonate, etc., potassium carbonate being preferred. It has been found that potassium carbonate provides superior results in terms of stabilizing and flocculating the clay particles as compared with other carbonates. The alkali metal carbonate will be present in the aqueous mixture in an amount from about 1.6 to about 9.4 grams per liter, preferably from about 2.8 to about 3.0 grams per liter.

The aqueous mixture will also contain an alkali metal chloride such as sodium chloride, potassium chloride, etc., sodium chloride being preferred, the alkali metal chloride serving to maintain the equilibrium of the interaction between the hectorite and the water-swellable clay. The alkali metal chloride will be present in the aqueous mixture in an amount of from about 1.6 to about 16.0 grams per liter, more preferably in an amount from about 1.6 to about 3 grams per liter, especially about 2.0 grams per liter.

As noted above, the grout composition of the present invention can be formed by mixing the above-described aqueous mixture with the proper amount of water-swellable clay. Generally speaking, the water-swellable clay will be present in the grout composition in an amount of about 15 to about 30% by weight, the aqueous mixture being present in an amount of from about 70 to about 85% by weight. In formulating the grout composition, a predetermined amount of the water-swellable clay is added to a predetermined amount of the aqueous mixture in such a manner that the water-swellable clay granules disperse slowly and uniformly into the aqueous mixture. This uniform slurry can be accomplished using simple mixing devices commonly employed for mixing liquids and solids.

The present invention also contemplates a dry, inorganic additive which can be used in forming a grout composition when admixed with water and a water-swellable clay. The dry additive will contain from about 21 to about 65% by weight hectorite as described above, from about 11 to about 42% of an alkali metal tetraborate as described above, from about 9 to about 38% by weight of an alkali metal carbonate as described above and from about 5 to about 15% by weight of an alkali metal chloride as described above. A particularly useful dry, inorganic additive can be achieved by mixing together synthetic hectorite in an amount of about 38.3% by weight, sodium tetraborate in an amount of about 33.3% by weight, potassium carbonate in an amount of about 16.7% by weight and sodium chloride in an amount of about 11.7% by weight. The dry, inorganic free-flowing additive can be conveniently transported in sacks, drums or the like to the site where the grouting is to take place, admixed with water in the desired amount to form the aqueous mixture as described above and then subsequently combined with the water-swellable clay to form the final grout composition.

In forming the grout composition, it is desired that the weight ratio between the alkali metal tetraborate, the alkali metal carbonate and the water-swellable clay be from about 1.0:1.0:75.0 to about 1.0:1.0:125.0. An especially desirable grout composition is achieved when the weight ratio of the alkali metal tetraborate to the alkali metal carbonate to the water-swellable clay is about 1.9:1.0:105.0. A particularly desirable grout composition is also achieved if the weight ratio between the hectorite and the water-swellable clay is from about 1.0:30.0 to about 1.0:50.0, a ratio of 1.0:42.0 being particularly preferred.

The grout compositions of the present invention are ideally suited for grouting or cementing conduits in place in well boreholes. In the method, the pumpable grout composition, as described above, is first formed. The grout composition is then disposed, as by pumping, in the annulus between a conduit and the well bore. The grout composition is then permitted to remain quiescent until it is set.

It will also be appreciated that the grout composition of the present invention can be used in other earth stabilization or sealing procedures where it is desired to effect a seal of an earth formation to prevent ingress or egress of fluids into or out of the earth formation.

To more fully illustrate the present invention, the following non-limiting examples are presented.

EXAMPLE 1

A dry, grout additive composition was prepared by blending together 11.2% sodium chloride (crystals), 40.75% synthetic hectorite (powder), 16.67% potassium carbonate (powder) and 31.49% sodium tetraborate (crystals). An aqueous slurry was prepared by adding 14.14 pounds (31.11 Kg) of the dry additive to 100 gallons (2.38 barrels) of fresh water and stirring well. To this aqueous mixture (slurry) was added 247.6 pounds (544.76 Kg) of 8 mesh granular sodium bentonite clay, containing over 85% sodium montmorillonite (7% moisture) to produce a grout composition with about 24% to 25% grout solids by total weight of the composition. The grout composition contained 22.6% by weight untreated granular sodium bentonite, 0.14% by weight sodium chloride, 0.53% by weight synthetic hectorite, 0.22% potassium carbonate, 0.41% sodium tetraborate and 76.10% fresh water.

The grout composition remained a pumpable slurry, achieving an optimum viscosity 45 minutes after mixing. The slurry shear strength increased as a function of time. Twelve (12) hours after mixing, the slurry composition began to cure and exhibited a shear strength of 1000 lb/100 sq. ft. Twenty-four (24) hours after mixing the shear strength increased to 2000 lb/100 sq. ft. and the slurry composition was considered initially cured. After 48 hours, the composition had cured to its final state with a good structural shear strength of 3800–4000 lb/100 sq. ft. The cured composition was sufficiently moldable.

EXAMPLE 2

The performance characteristics of various grout compositions were measured using the following evaluation criteria:

1. Dispersion Performance: During mixing and particularly when mixing water-swellable clays, two visual observations, fish-eye formation ($R_1$) and clay particle settling ($R_2$) are made. Both of these phenomena can cause problems, such as plugging pumps and lost circulation, resulting from poor dispersibility of the water-swellable clay in the grout composition.

2. Viscosity Profile as a Function of Time: This profile ($R_3$) is obtained by measuring the slope of the line generated by 300 rpm readings of a FANN 35A viscometer with five multiple springs versus a time interval in minutes after the mixing of the grout composition. The desirable grout composition should produce an $R_3$ value between a predetermined upper limit of 9.00 and a lower limit of 5.67. If the composition has a $R_3$ value below 5.67, the final grout composition will be too fluid-like and have a very long set time. If the $R_3$ value exceeds 9.00, the grout composition will have a short set time and the slurry may be too thick to pump.

3. Shear Strength Profile as a Function of Time: This profile ($R_4$) is obtained by determining the slope of the line generated by the grout shear strength in lb/100 sq. ft. versus days after mixing. The desirable grout composition should have an $R_4$ value exceeding the predetermined value of 40.0. Below this value the final grout composition will not cure in 48 hours and exhibit weak structural strength.

4. Shear Strength After 24 Hours Mixing: In relation to the shear strength profile ($R_4$), an additional parameter ($R_5$) for evaluation must be considered. This is the shear strength of the grout composition after 24 hours mixing. If the 24 hour shear strength of the grout is below 900 lb/100 sq. ft., even though the slope of the shear strength profile ($R_4$) is greater than the predetermined value of 40.0, the final grout composition will not have the desirably firm texture.

The results are listed in Table I below.

TABLE I

EVALUATION OF GROUT COMPOSITIONS AND THEIR PERFORMANCE CHARACTERISTICS BY CRITERIA DEVELOPED

| Grout Number | Components Weight % | | | | | | Evaluation Criteria* | | | | | Overall Performance |
|---|---|---|---|---|---|---|---|---|---|---|---|---|
| | NaCl | Hectorite (Synthetic) | $K_2CO_3$ | $Na_2B_4O_7 \cdot 10H_2O$ | Sodium Bentonite | Water | $R_1$ | $R_2$ | $R_3$ | $R_4$ | $R_5$ | |
| 1 | 0.22 | 0.54 | 0.43 | 0.43 | 22.6 | 75.8 | No | No | 2.2 | 25.0 | 720 | Poor (slurry too thin) |
| 2 | 0.17 | 0.54 | 0.22 | 0.43 | 23.6 | 75.1 | Yes | No | 6.3 | 50.0 | 767 | Poor (low shear strength) |
| 3 | 0.21 | 0.63 | 0.27 | 0.27 | 22.6 | 76.1 | No | No | 10.0 | 117.0 | 1900 | Poor (set time too short) |
| 4 | 0.16 | 0.56 | 0.19 | 0.19 | 23.7 | 75.2 | Yes | No | 10.0 | 96.0 | 1660 | Poor (set time too short) |
| 5 | 0.14 | 0.53 | 0.43 | 0.41 | 29.7 | 75.9 | Yes | Yes | 3.0 | 32.0 | 500 | Poor (slurry too thin) |
| 6 | 0.14 | 0.43 | 0.43 | 0.22 | 22.6 | 76.2 | No | No | 8.2 | 45.0 | 1040 | Fair |
| 7 | 0.14 | 0.43 | 0.22 | 0.40 | 22.6 | 76.1 | Yes | Yes | 8.0 | 33.0 | 1764 | Poor (cure time too long) |
| 8 | 0.14 | 0.53 | 0.43 | 0.22 | 22.6 | 76.1 | Yes | No | 11.7 | 26.0 | 1765 | Poor (slurry too thick) |
| 9 | 0.17 | 0.53 | 0.43 | 0.22 | 22.6 | 76.1 | No | No | 9.0 | 46.0 | 1470 | Fair |
| 10 | 0.17 | 0.53 | 0.22 | 0.41 | 22.6 | 76.1 | No | No | 7.5 | 87.5 | 1600 | Good grout |
| 11 | 0.14 | 0.53 | 0.21 | 0.41 | 22.8 | 75.9 | No | No | 7.5 | 78.7 | 2000 | Good grout |

*$R_1$ = forming fish-eye
$R_2$ = settling of clay
$R_3$ = viscosity profile $9.0 < R_3 < 5.6$
$R_4$ = shear strength profile $R_4 > 40.0$
$R_5$ = shear strength (lb/100 sq. ft) after 24 hours mixing $R_5 > 900$

EXAMPLE 3

A $2^4$ full factorial experimental design was performed to study the total effect of each component in the grout composition on the viscosity of the grout slurry. Table II lists sixteen (16) combinations of the four components in their high (+) and low (−) concentration range. Column 18 in Table II shows the relative coefficient which indicates the degree of influence on the slurry viscosity from a single component or a joint effect from multiple components. The higher the coefficient, the stronger the effect on that performance characteristic being evaluated. Component number 3, i.e. potassium carbonate and component number 4, i.e. sodium tetraborate, have a predominant effect on slurry viscosity. The optimum ratio of potassium carbonate to sodium tetraborate determined by the Simplex experimental design procedure is 1 to 1.86.

TABLE II

TOTAL EFFECTS OF SLURRY VISCOSITY BY $2^4$ FULL FACTORIAL DESIGN

Components:
1 = NaCl
2 = Hectorite (Synthetic)
3 = $K_2CO_3$
4 = $Na_2B_4O_7 \cdot 10H_2O$

| I | 1 | 2 | 3 | 4 | 1·2 | 1·3 | 1·4 | 2·3 | 2·4 | 3·4 | 1·2·3 | 1·2·4 | 1·3·4 | 1·2·3·4 | 2·3·4 | $R_3$ | Effects | I.D. |
|---|---|---|---|---|-----|-----|-----|-----|-----|-----|-------|-------|-------|---------|-------|-------|---------|------|
| + | − | − | − | − | + | + | + | + | + | + | − | − | − | − | + | 21.7 | 9.07 | Ave |
| + | + | − | − | − | − | − | − | + | + | + | + | + | + | − | − | 13.3 | −2.90 | 1 |
| + | − | + | − | − | − | + | + | − | − | + | + | + | − | + | − | 21.7 | +0.73 | 2 |
| + | + | + | − | − | + | − | − | − | − | + | − | − | + | + | + | 13.3 | −6.77* | 3 |
| + | − | − | + | − | + | − | + | − | + | − | + | − | + | + | − | 8.2 | −8.19* | 4 |
| + | + | − | + | − | − | + | − | − | + | − | − | + | − | + | + | 6.5 | +0.02 | 1·2 |
| + | − | + | + | − | − | − | + | + | − | − | − | + | + | − | + | 11.7 | +1.44 | 1·3 |
| + | + | + | + | − | + | + | − | + | − | − | + | − | − | − | − | 9.0 | +2.35 | 1·4 |
| + | − | − | − | + | + | + | − | + | − | − | − | − | + | + | − | 8.0 | +0.81 | 2·3 |
| + | + | − | − | + | − | − | + | + | − | − | + | + | − | + | + | 7.0 | −0.77 | 2·4 |
| + | − | + | − | + | − | + | − | − | + | − | + | + | + | − | + | 7.2 | +1.90 | 3·4 |
| + | + | + | − | + | + | − | + | − | + | − | − | − | − | − | − | 7.5 | −0.31 | 1·2·3 |
| + | − | − | + | + | + | − | − | − | − | + | + | + | − | − | + | 2.8 | +0.27 | 1·2·4 |
| + | + | − | + | + | − | + | + | − | − | + | − | − | + | − | − | 2.2 | −1.65 | 1·3·4 |
| + | − | + | + | + | − | − | − | + | + | + | − | − | − | + | − | 3.0 | −0.69 | 2·3·4 |
| + | + | + | + | + | + | + | + | + | + | + | + | + | + | + | + | 2.2 | −0.06 | 1·2·3·4 |
| divisor 16 | 8 | 8 | 8 | 8 | 8 | 8 | 8 | 8 | 8 | 8 | 8 | 8 | 8 | 8 | 8 | | | |

$R_3$ = Viscosity profile parameter
* = Predominant effect

EXAMPLE 4

Synthetic hectorite, one of the components used in the present grout formulation, can be classified as a silicate but it exhibits different characteristics in grout compositions as compared with other sodium silicate compounds. Table III illustrates the grout performance characteristics resulting from various grout compositions varying only the type of silicate used in the formulation.

TABLE III

COMPARATIVE PERFORMANCE CHARACTERISTICS OF GROUT COMPOSITIONS CONSISTING OF SODIUM SILICATES VERSUS SYNTHETIC HECTORITE

| Components | Grout Composition, Weight, % | | | |
|---|---|---|---|---|
| | A | B | C | D |
| Sodium Chloride | 0.15 | 0.15 | 0.15 | 0.15 |
| Sodium Silicate | — | 0.52 | — | — |
| Diatomite Silicate | 0.52 | — | — | — |
| Fumed Silica | — | — | 0.52 | — |
| Hectorite (Synthetic) | — | — | — | 0.52 |
| Potassium Carbonate | 0.22 | 0.22 | 0.22 | 0.22 |
| Sodium Tetraborate | 0.41 | 0.41 | 0.41 | 0.41 |
| Sodium Bentonite | 22.78 | 22.78 | 22.78 | 22.78 |
| Water | 75.92 | 75.92 | 75.92 | 75.92 |
| Evaluation Criteria | | | | |
| $R_1$ (fish-eye) | Yes | Yes | Yes | No |
| $R_2$ (settling) | Yes | Yes | Yes | No |
| $R_3$ (viscosity profile) | 6.7 | 7.7 | 6.5 | 7.0 |
| $R_4$ (shear strength profile) | 15.5 | 32.5 | 14.5 | 78.7 |
| $R_5$ (shear strength after 24 hr. mixing) | 1000 | 642 | 750 | 2000 |
| Overall Evaluation | Poor | Poor | Poor | Good |

Limitation
1. $12.0 < R_3 < 5.7$
2. $R_4 > 40.0$
3. $R_5 > 900$

As can be seen from Table III, hectorite produces a vastly superior grout as compared with other silicates.

EXAMPLE 5

The sealing capabilities of various grout compositions were determined by a hydraulic conductivity (coefficient of permeability) measurement. The procedure which was used involved placement of a two-inch grout slurry in a fixed wall such as an API standard filter cell with a crosssectional area of 47.4 cm², followed by saturation with water. The mixture was allowed to stand for a period of time before a permeant fluid such as water was drawn into the test cell under pressure. The cell was pressurized at a constant pressure of 6 psi (equivalent to 14 feet water head). The hydraulic gradient, defined as head pressure divided by thickness of the test sample, equals 84. The permeant fluid seeping through the grout composition was collected and read over some definite time interval, i.e. 24 hours. The hydraulic conductivity was calculated based upon Darcy's Law. The following data listed in Table IV shows comparative sealing effectiveness of the grout composition of Example 1 and prior art grout compositions as determined by their hydraulic conductivity data.

TABLE IV

COMPARATIVE HYDRAULIC CONDUCTIVITY OF GROUT COMPOSITIONS

| Grout Type | Hydraulic Conductivity, K, cm/sec | Test Period Days | Seepage pH (color) |
|---|---|---|---|
| Example 1 | $1.01 \times 10^{-8}$ | 28 | 9.0 (clear) |
| Sodium Bentonite/ Calcium Bentonite (filler)/ Sodium Silicate/Cations | $1.00 \times 10^{-8}$ | 14 | 10.0 (yellow) |
| Neat Cement | $1.00 \times 10^{-6}$ | 7 | 11.0 (clear) |
| Sand (filler) | $1.00 \times 10^{-4}$ | 5 | 7.0 (clear) |

Test Condition:
Method: Constant head with fixed-wall cell
Permeant Fluid: Tap Water
Hydrostatic Head: 14-ft water head
Compaction: Free flow up to 2 inches depth
Gradient: At 84

As can be seen from Table IV, the grout composition of the present invention shows vastly superior sealing characteristics as compared with prior art grout compositions.

EXAMPLE 6

Percent rehydration measures the sealing capability of a grout composition after rehydration once the grout loses its moisture content due to heat exposure or evaporation. The percent rehydration was calculated by dividing the hydraulic conductivity of the grout composition before dehydration over that after rehydration. An experiment was conducted by taking the cells, after determining initial hydraulic conductivity measurements in Example 5, and heating to 170° F. for three hours. After cooling, an equal amount of water was added to the dry grout composition to compensate for the amount of moisture loss. After rehydration, the hydraulic conductivity measurements were carried out under the same conditions described in Example 5. Table V shows comparative hydraulic conductivities before dehydration and after rehydration, and percent of rehydration.

TABLE V

COMPARATIVE PERCENT OF REHYDRATION OF GROUT COMPOSITIONS

| Grout Type | Hydraulic Conductivity, K, cm/sec | | Rehydration |
|---|---|---|---|
| | Before Dehydration | After Rehydration | |
| Example 1 | $1.01 \times 10^{-8}$ | $1.23 \times 10^{-8}$ | 82% |
| Sodium Bentonite/ Calcium Bentonite (filler)/ Sodium Silicate/Cations | $1.00 \times 10^{-8}$ | $7.50 \times 10^{-8}$ | 13% |

As can be seen from Table V, the grout composition of the present invention shows a markedly greater ability to rehydrate as compared with a typical prior art grout composition.

As can be seen from the Examples, the grout composition of the present invention is pumpable and rehydratable. Moreover, the grout composition is free of organic polymeric material which could pose environmental problems, particularly in water wells.

The foregoing disclosure and description of the invention is illustrative and explanatory thereof, and various changes in the method steps as well as in the details of the composition may be made within the scope of the appended claims without departing from the spirit of the invention.

What is claimed is:

1. A pumpable grout composition comprising from about 15 to about 30% by weight of a water swellable clay and an aqueous mixture comprising from about 1.5 to about 15.5 grams per liter of said mixture of a hectorite, from about 3.0 to about 11.0 grams per liter of said mixture of an alkali metal tetraborate, from about 1.6 to about 9.4 grams per liter of said mixture of an alkali metal carbonate and from about 1.6 to about 16 grams per liter of said mixture of an alkali metal chloride.

2. The composition of claim 1 wherein said alkali metal tetraborate comprises sodium tetraborate present in an amount of about 4 to about 6 grams per liter of said mixture.

3. The composition of claim 1 wherein said alkali metal carbonate comprises potassium carbonate present in an amount of from about 2.8 to about 3 grams per liter of said mixture.

4. The composition of claim 1 wherein said hectorite comprises synthetic hectorite being present in an amount of from about 5.7 to about 7.0 grams per liter of said mixture.

5. The composition of claim 1 wherein the weight ratio between said alkali metal tetraborate, said alkali metal carbonate and said water swellable clay is from about 1.0:1.0:75 to about 1.0:1.0:125.0.

6. The composition of claim 1 wherein the weight ratio between said hectorite and said water swellable clay is from about 1.0:30.0 to about 1.0:50.0.

7. The composition of claim 1 wherein said water swellable clay comprises sodium bentonite.

8. The composition of claim 2 wherein said water swellable clay comprises sodium bentonite.

9. The composition of claim 3 wherein said water swellable clay comprises sodium bentonite.

10. The composition of claim 4 wherein said water swellable clay comprises sodium bentonite.

11. The composition of claim 5 wherein said water swellable clay comprises sodium bentonite.

12. The composition of claim 6 wherein said water swellable clay comprises sodium bentonite.

13. An aqueous mixture for admixing with a water swellable clay to form a grout composition comprising water, from about 1.5 to about 15.5 grams per liter of said mixture of a hectorite, from about 3.0 to about 11.0 grams per liter of said mixture of an alkali metal tetraborate, from about 1.6 to about 9.4 grams per liter of said mixture of an alkali metal carbonate and from about 1.6 to about 16.0 grams per liter of said mixture of an alkali metal chloride.

14. The mixture of claim 13 wherein said alkali metal tetraborate comprises sodium tetraborate present in an amount of from about 4 to about 6 grams per liter of said mixture.

15. The mixture of claim 13 wherein said alkali metal carbonate comprises potassium carbonate present in an amount of from about 2.8 to about 3.0 grams per liter of said mixture.

16. The mixture of claim 13 wherein said hectorite comprises synthetic hectorite being present in an amount of from about 5.7 to about 7 grams per liter of said mixture.

17. A dry, inorganic additive useful in forming a grout composition comprising from about 21 to about 65% by weight of hectorite, from about 11 to about 42% by weight of an alkali metal tetraborate, from about 9 to about 38% by weight of an alkali metal carbonate and from about 5 to about 15% by weight of an alkali metal chloride.

18. The additive of claim 17 wherein said hectorite is synthetic hectorite present in an amount of about 38.3% by weight.

19. The additive of claim 17 wherein said alkali metal tetraborate comprises sodium tetraborate present in an amount of about 33.3% by weight.

20. The additive of claim 17 wherein said alkali metal carbonate comprises potassium carbonate present in an amount of about 16.7 percent by weight.

21. The additive of claim 12 wherein said alkali metal chloride comprises sodium chloride present in an amount of about 11.7% by weight.

22. A method of forming a grout seal in an annulus between a conduit and an earth borehole comprising the steps of:
forming a pumpable grout composition comprising from about 80 to about 95% by weight of a water swellable clay and an aqueous mixture comprising from about 1.5 to about 15.5 grams per liter of said mixture of a hectorite, from about 3.0 to about 11.0 grams per liter of said mixture of an alkali metal tetraborate, from about 1.6 to about 9.4 grams per liter of said mixture of an alkali metal carbonate and from about 1.6 to about 16 grams per liter of said mixture of an alkali metal chloride;
disposing said grout composition in said annulus; and permitting said grout composition to set.

23. The method of claim 22 wherein said alkali metal tetraborate comprises sodium tetraborate present in an amount of about 4 to about 6 grams per liter of said mixture.

24. The method of claim 22 wherein said alkali metal carbonate comprises potassium carbonate present in an amount of from about 2.8 to about 3 grams per liter of said mixture.

25. The method of claim 22 wherein said hectorite comprises synthetic hectorite being present in an amount of from about 5.7 to about 7.0 grams per liter of said mixture.

26. The method of claim 22 wherein the weight ratio between said alkali metal tetraborate, said alkali metal carbonate and said water swellable clay is from about 1.0:1.0:75.0 to about 1.0:1.0:125.0.

27. The method of claim 22 wherein the weight ratio between said hectorite and said water swellable clay is about 1.0:30.0 to about 1.0:50.0.

28. The method of claim 22 wherein said water swellable clay comprises sodium bentonite.

29. The method of claim 23 wherein said water swellable clay comprises sodium bentonite.

30. The method of claim 24 wherein said water swellable clay comprises sodium bentonite.

31. The method of claim 25 wherein said water swellable clay comprises sodium bentonite.

32. The method of claim 26 wherein said water swellable clay comprises sodium bentonite.

33. The method of claim 27 wherein said water swellable clay comprises sodium bentonite.

* * * * *